US011372016B2

(12) United States Patent
Cox-Muranami et al.

(10) Patent No.: US 11,372,016 B2
(45) Date of Patent: Jun. 28, 2022

(54) MULTI-VALVE FLUID CARTRIDGE

(71) Applicant: Illumina, Inc., San Diego, CA (US)

(72) Inventors: Wesley A. Cox-Muranami, San Diego, CA (US); James Osmus, San Diego, CA (US); Paul Crivelli, San Diego, CA (US); Bradley Kent Drews, Poway, CA (US)

(73) Assignee: ILLUMINA, INC., San Diego, CA (US)

( * ) Notice: Subject to any disclaimer, the term of this patent is extended or adjusted under 35 U.S.C. 154(b) by 211 days.

(21) Appl. No.: 16/584,306

(22) Filed: Sep. 26, 2019

(65) Prior Publication Data

US 2020/0110108 A1 Apr. 9, 2020

Related U.S. Application Data

(60) Provisional application No. 62/741,785, filed on Oct. 5, 2018.

(51) Int. Cl.
*G01N 35/10* (2006.01)

(52) U.S. Cl.
CPC .............................. *G01N 35/1097* (2013.01)

(58) Field of Classification Search
CPC . G01N 35/1097; G01N 35/1095; G01N 35/10
USPC .............................................. 436/180; 422/63
See application file for complete search history.

(56) References Cited

U.S. PATENT DOCUMENTS

| | | | |
|---|---|---|---|
| 5,273,905 A | 12/1993 | Mueller et al. | |
| 6,813,568 B2 * | 11/2004 | Powell | B01J 19/0046 422/521 |
| 7,195,229 B2 | 3/2007 | Maeda | |
| 8,501,096 B2 | 8/2013 | Leif | |
| 8,545,773 B2 | 10/2013 | Su et al. | |
| 2003/0156989 A1 | 8/2003 | Safir | |
| 2005/0124028 A1 | 6/2005 | Windeyer et al. | |
| 2010/0024527 A1 | 2/2010 | Lamarr et al. | |
| 2018/0187259 A1 | 7/2018 | Drews et al. | |

FOREIGN PATENT DOCUMENTS

| | | |
|---|---|---|
| CN | 1310980 A | 9/2001 |
| CN | 1589407 A | 3/2005 |
| CN | 202002835 U | 10/2011 |
| CN | 204198724 U | 3/2015 |
| CN | 204731088 U | 10/2015 |
| CN | 107076774 A | 8/2017 |
| CN | 107860632 A | 3/2018 |
| WO | 2014001531 A2 | 1/2014 |

* cited by examiner

*Primary Examiner* — Christine T Mui
(74) *Attorney, Agent, or Firm* — Rothwell, Figg, Ernst & Manbeck, P.C.

(57) ABSTRACT

An apparatus includes a fluidic circuit, a bypass fluidic circuit, a first set of fluid wells, a second set of fluid wells, a first valve, and a second valve. The first valve operatively associated with the first set of fluid wells such that the first selectively fluidly connects any one of the first set of fluid wells to a first valve outlet. The second valve operatively associated with the fluidic circuit, the bypass fluidic circuit, the first valve outlet, and the second set of fluid wells such that the second valve selectively fluidly connects any one of the second set of fluid wells and the first valve outlet to the fluidic circuit or the first valve outlet to the bypass fluidic circuit.

20 Claims, 9 Drawing Sheets

MULTI-VALVE FLUID CARTRIDGE

CROSS REFERENCE TO RELATED APPLICATION

This application claims the benefit under 35 U.S.C. § 119(e) of the filing date of provisional patent application Ser. No. 62/741,785 filed Oct. 5, 2018, the disclosure of which is incorporated herein by reference.

BACKGROUND

The need to prime and sequence various types of fluids for different fluid operations on a microfluidic cartridge can be problematic due to, for example, limited space availability. Some microfluidic systems house various types of fluids away from the fluidic region of interest (e.g., flow cell, a mixing reservoir) and have a single flow control valve operatively associated with the various types of fluids, such that the flow control valve selects one of the fluids for the particular fluid operation and directs the selected fluid to the fluidic region of interest for processing. Each fluid operation of the microfluidic cartridge involves moving the selected fluid a common distance from the flow control valve to the entrance of the fluidic region of interest, which limits the volume of fluid that may be transferred in each step of the operation. Consequently, each operation typically requires executing numerous fluid transfers to move a total desired volume of fluid, thereby increasing the cycle of time of each fluid operation.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure encompass an apparatus comprising a fluidic circuit, a bypass fluidic circuit, a first set of fluid wells, a second set of fluid wells, a first valve having a first valve outlet and a plurality of first well ports, the plurality of first well ports operatively associated with the first set of fluid wells, and a second valve having a second valve outlet a bypass selector channel, and a plurality of second well ports. In some examples, the first valve selectively fluidly connects a first well of the first set of fluid wells to the first valve outlet when in a first position and selectively fluidly connects a second well of the first set of fluid wells to the first valve outlet when in a second position. In some examples, the second valve outlet is operatively associated with the fluidic circuit, and the bypass selector channel is operatively associated with the bypass fluidic circuit and the first valve outlet such that the second valve selectively fluidly connects a first well of the second set of fluid wells to the fluidic circuit when in a first well position and selectively fluidly connecting the bypass selector channel to the bypass fluidic circuit when in a bypass position.

Aspects of the disclosure encompass an method comprising a process of selecting a first fluid stored in a first fluid well of a first set of fluid wells operatively associated with a first valve by setting the first valve from a block position to a first fluid well position; a process of moving at least a portion of the selected first fluid from the first valve into a bypass channel operatively associated with a second valve by setting the second valve to a bypass position; a process of selecting a second fluid stored in a second fluid well of a second set of fluid wells operatively associated with the second valve by setting the second valve to a second fluid well position; and a process of moving at least a portion of the selected second fluid into a fluidic circuit while the portion of the selected first fluid is in the bypass channel.

Aspects of the disclosure encompass an apparatus comprising a fluidic circuit fluidly connected to a flow cell; a bypass channel; a first fluid well; a second fluid well; a first valve comprising a first valve outlet port and a plurality of first well ports, a first of the plurality of first well ports operatively associated with the first fluid well such that the first valve selectively permits flow from the first fluid well to the outlet port; and a second valve comprising: a second valve outlet port fluidly connected to the fluidic circuit, a bypass port fluidly connected to the bypass channel, a second valve inlet port fluidly connected to the first valve outlet port, a second fluid well port fluidly connected to the second fluid well, and a second valve rotary body to rotate to a plurality of second valve positions such that the second valve selectively permits flow from a selected one of the second fluid well port and the second valve inlet port to the second valve outlet port or from the second valve inlet port to the bypass port.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various examples of the subject matter of this disclosure. In the drawings, like reference numbers indicate identical or functionally similar elements.

DETAILED DESCRIPTION

Figure 1:
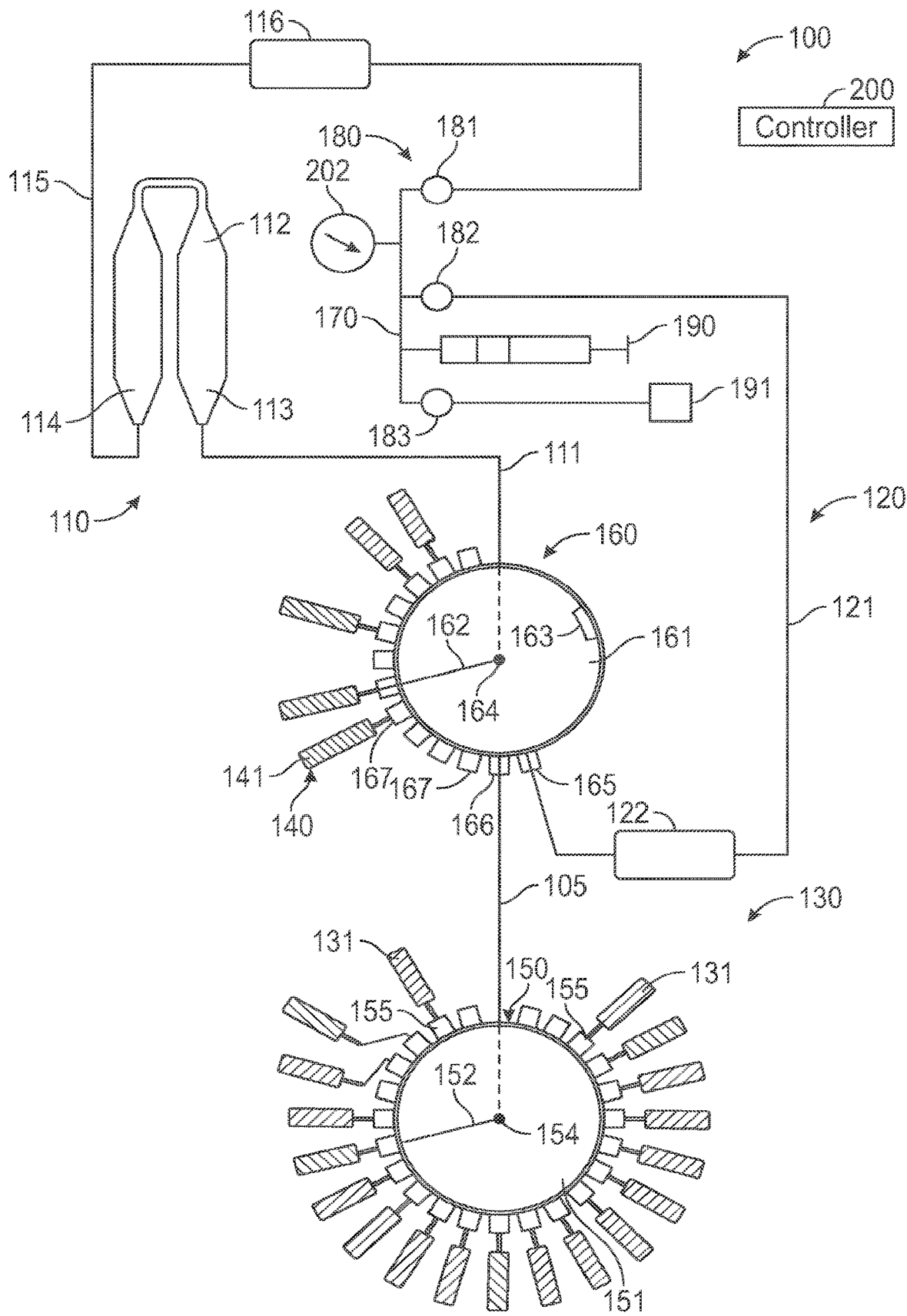
FIG. 1 is a schematic view of an apparatus for directing fluid from any one of a first set of wells to a fluidic circuit or a bypass circuit and any one of a second set of wells to a fluidic circuit.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an example implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

According to various examples, assemblies and devices as described herein may be used in combination with a fluid cartridge that may comprise one or more fluid processing passageways including one or more elements, for example, one or more of a channel, a branch channel, a valve, a flow splitter, a vent, a port, an access area, a via, a bead, a reagent containing bead, a cover layer, a reaction component, any combination thereof, and the like. Any element may be in fluid communication with another element.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve, bursting a burstable valve, or otherwise opening a valve disposed in the fluid processing passageway.

Fluid Cartridge

There is a need for improved fluid cartridge apparatuses and methods that permit more than one fluid operation to occur at a time. Such fluid operations can occur independent of each other on the fluid cartridge to curtail the accumulative time of a fluid process. In addition, there is a need for improved fluid cartridge apparatuses and methods that can isolate fluids processed on the fluid cartridge by providing a dedicated valve channel for each type of fluid operation to prevent unintended cross-contamination between the fluids.

According to various examples, an apparatus comprises a fluid cartridge that is configured to hold various types of fluids (e.g., reagents, buffer, reaction media) and selectively move the various types of fluids through two or more independent fluidic operations (e.g., mixing, incubating, or transferring of fluids). The fluid cartridge comprises a first set of wells configured to hold one or more types of fluid associated with a first fluid processing operation and a second set of wells configured to hold one or more types of fluid associated with a second fluid processing operation. The fluid cartridge comprises a fluidic circuit and a bypass fluidic circuit to conduct independent fluidic operations. A first valve is operatively associated with the first set of wells such that the first valve may selectively permit fluid flow from any one of the first set of wells. A second valve is operatively associated with the first valve, the fluidic circuit, the bypass fluidic circuit, and any one of the second set of wells to selectively permit fluid flow from one well of the second set of fluid wells to the fluidic circuit, the first valve to the fluidic circuit, or the first valve to the bypass fluidic circuit. In some instances, the second valve can also be advantageously utilized for frequent fluidic operations (e.g., repeating sequencing operations) while the first valve may be used for less frequent fluidic operations (e.g., paired-end or amplification operations). Separation of the valves in this manner can result in a reduced space claim for each valve and optimization of each valve to accomplish high frequency operations and low frequency operations.

As shown in FIG. 1, an example apparatus comprises a fluid cartridge 100 for holding various types of fluids and selectively sequencing the various types of fluids through two or more independent fluidic operations. In some examples, the fluid cartridge 100 comprises a fluidic circuit 110, a bypass fluidic circuit 120, a first set of wells 130, a second set of wells 140, a first valve 150, a second valve 160, a common channel 105, an outlet channel 170, and a valve array 180. In some examples, the fluid cartridge 100 comprises a substrate (not shown) supporting various components of the cartridge, such as, the first set of wells 130, the second set of wells 140, the first valve 150, the second valve 160, and the valve array 180, although one or more components of the cartridge may not be supported on a common substrate or other supporting structure. In some examples, the fluidic circuit 110, the bypass fluidic circuit 120, and the outlet channel 170 comprise one or more fluid channels or conduits disposed on or within the substrate of the fluid cartridge 100 to transmit fluid within the fluid cartridge 100 and to other devices fluidly connected to the fluid cartridge 100.

As shown in FIG. 1, the fluidic circuit 110 comprises a fluidic device 112 (e.g., flow cell) and two or more fluid channels 111, 115 that fluidly connect the fluidic device 112 to the second valve 160, and the outlet channel 170, respectively. In one example, the fluidic device 112 is a flow cell comprising a first glass layer (not shown) and a second glass layer (not shown) secured together and defining one or more channels (not shown) therein. In various examples, the fluidic device 112 may include a fluid inlet 113, a fluid outlet 114, and one or more fluid channels (not shown) fluidly connected to the fluid inlet 113 and the fluid outlet 114 to allow fluid processing, such as a chemical or biochemical assay or other reaction, to take place. In various examples, the fluidic device 112 is configured to allow the introduction of various types of fluids (e.g., reagents, buffers, reaction media) into the fluid inlet 113 to undergo fluid processing within the one or more fluid channels. In various examples, fluidic device 112 is further configured to allow the various types of fluids to be flushed out of the one or more fluid channels through the fluid outlet 114.

In the example shown in FIG. 1, channel 111 is an inlet channel fluidly connecting the fluid inlet 113 of the fluidic device 112 to the second valve 160 and channel 115 is a post line channel fluidly connecting the fluid outlet 114 of the fluidic device 112 to the outlet channel 170 (two channels are shown in the illustrated example although the fluidic circuit 110 may include more than two channels in other examples). In some examples, the fluidic circuit 110 comprises a cache reservoir 116 in line with the post line channel 115 configured to hold a volume of fluid that has passed through the fluidic device 112 such that fluid exiting the fluidic device 112 may be held temporarily before being directed to the outlet channel 170. The cache reservoir 116 is configured to allow bidirectional fluid flow such that cache reservoir 116 may also hold fluid directed from the outlet channel 170 and permit fluid flow to the fluidic device 112.

In some examples, the fluidic device 112 is an integral part of the cartridge 100. In other examples, the fluidic device 112 is removably attached or coupled to the cartridge 100, e.g., via fluidic connectors connecting the fluid inlet 113 and fluid outlet 114 to the inlet channel 111 and the post line channel 115, respectively.

In the example shown in FIG. 1, the bypass fluidic circuit 120 comprises a bypass fluid channel 121 fluidly connecting the second valve 160 to the outlet channel 170 (one channel is shown in the illustrated example although the bypass fluidic circuit 120 may include two or more channels in other examples). The bypass fluid channel 121 is configured to allow fluid to flow from the second valve 160 to the outlet channel 170 without flowing through the fluidic device 112. In some examples, the bypass fluidic circuit 120 comprises a cache reservoir 122 in line with bypass fluid channel 121 configured to hold a volume of fluid that has been supplied from the second valve 160 such that fluid may be held temporarily before being directed to the outlet channel 170. The cache reservoir 122 is configured to allow bidirectional fluid flow such that cache reservoir 122 may also hold fluid directed from the outlet channel 170 and permit fluid flow to the second valve 160.

In the example shown in FIG. 1, the common channel 105 connects the first valve 150 and the second valve 160.

Figure 2:
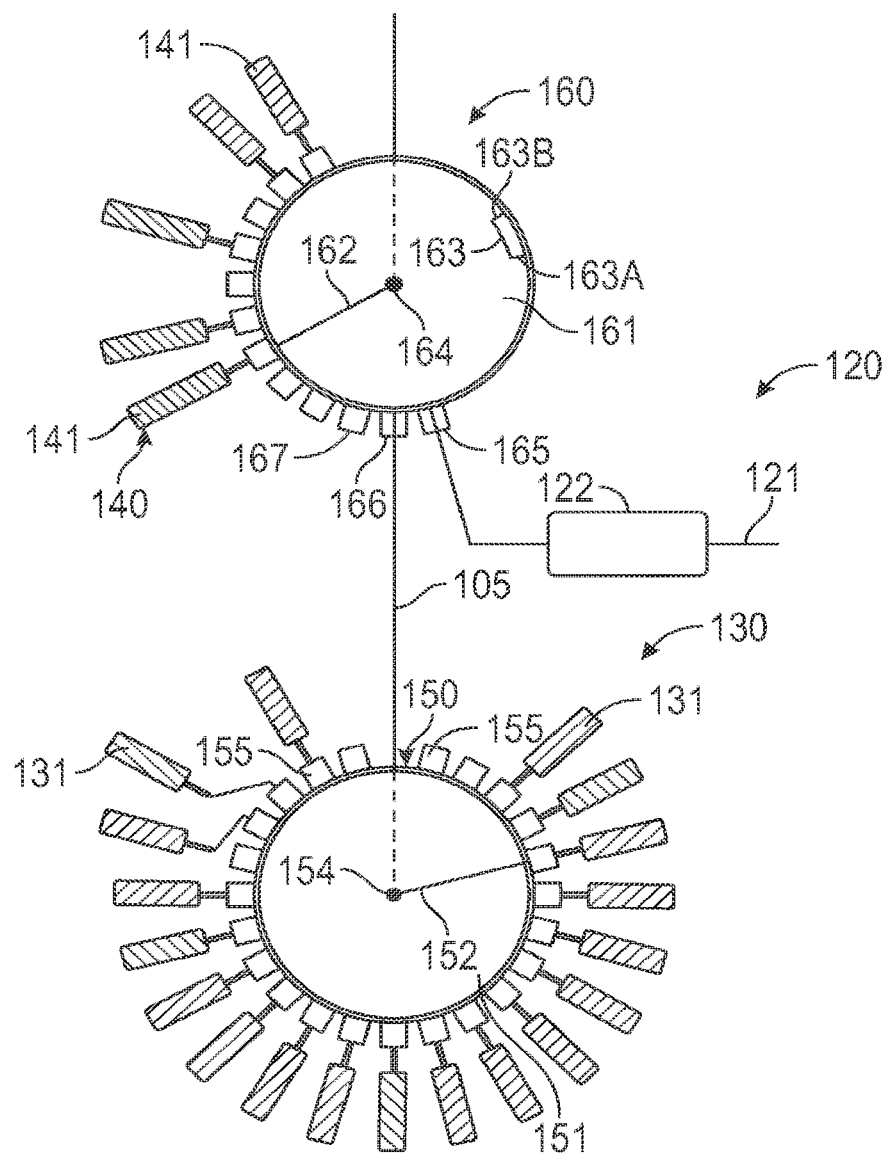
FIG. 2 is a schematic view of an example first valve and example second valve with a bypass circuit.

As shown in FIGS. 1 and 2, the first set of wells 130 comprises two or more first fluid wells 131 that are coupled to the first valve 150 so as to be fluidly connectable to the first valve 150. In the illustrated example, nineteen first fluid wells 131 are coupled to the first valve 150, although any number of two or more first fluid wells is contemplated by this disclosure. The different fluid wells 131 of the first set of wells 130 may have the same or varying sizes (i.e., volumes)—e.g., all fluid wells 131 may have the same volume, all fluid wells 131 may have different volumes, or a subset of the fluid wells 131 may have the same volume and a subset of the wells 131 may have different volumes—depending on the necessary storage volume of the reagents or other fluid to be stored in each first fluid well 131.

As shown in FIGS. 1 and 2, the second set of wells 140 comprises two or more second fluid wells 141 that are coupled to the second valve 160 so as to be fluidly connectable to the second valve 160. In the illustrated example, five second fluid wells 141 are coupled to the second valve 160, although any number of two or more second fluid wells is contemplated by this disclosure. The different fluid wells 141 of the second set of wells 140 may have the same or varying sizes (i.e., volumes)—e.g., all fluid wells 141 may have the same volume, all fluid wells 141 may have different volumes, or a subset of the fluid wells 141 may have the same volume and a subset of the wells 141 may have different volumes—depending on the necessary storage volume of the reagents, buffer, or other fluid to be stored in each second fluid well 141.

First valve 150 is constructed and arranged to selectively, fluidly connect one of the first fluid wells 131 of the first set of wells 130 to the common channel 105, and thus, to the second valve 160. In the example shown in FIGS. 1 and 2, the first valve 150 is a rotary valve comprising a first rotary body 151 rotatably mounted within the fluid cartridge 100. In some examples, the first rotary body 151 comprises a disc (not shown) made from a rigid plastic material (e.g., polypropylene) and a cap (not shown) made from an elastomer material (e.g., Dynaflex®, Santoprene®, and silicone). In various examples, the first valve 150 includes a plurality of first well ports 155, each associated with one of the first fluid wells 131 of the first set of wells 130. In the example shown in FIGS. 1 and 2, the set of first well ports 155 are disposed in a circumferential pattern about the first rotary body 151 such that each first well port 155 is located at the same radial distance from a center of the first rotary body 151. In other examples (not shown), the set of first well ports 155 may be placed in other arrangements that fluidly connect the first valve 150 to the first set of wells 130. In some examples, each first well port 155 is fluidly connected to its associated first fluid well 131 by a fluid channel.

Referring to FIG. 2, the first valve 150 comprises a first valve outlet, e.g., first valve outlet port 154, fluidly connected to the second valve 160 by the common fluid channel 105 that extends from the first valve outlet port 154 of the first valve 150 to a second valve inlet port 166 of the second valve 160. In some examples, the outlet port 154 may be disposed at about the center of the first rotary body 151. In the illustrated example, a portion of the common fluid channel 105 extending from the first valve outlet port 154 that is superimposed with the rotary body 151—e.g., extends beneath the first rotary body 151—is shown in dashed lines.

In the example shown in FIGS. 1 and 2, the first rotary body 151 includes a first valve selector channel 152 extending radially from the first valve outlet port 154 toward a circumferential edge of the rotary body 151.

In various examples, the rotary body 151 is configured to rotate between a plurality of angular positions so that the first valve selector channel 152 may fluidly connect any one of the first fluid wells 131 to the first valve outlet port 154 via each well's respective first well port 155. When the rotary body 151 is rotated to an angular position such that the first valve selector channel 152 is aligned with the one of the first well ports 155, fluid may flow from the selected first fluid well 131, through the valve selector channel 152, and into the first valve outlet port 154.

In some examples, the first valve 150 may comprise a hard stop (not shown) to limit the rotation of the rotary body 151 at a block position where the first valve selector channel 152 is not aligned with any one of the first well ports 155. In some examples, the hard stop comprises a protrusion projecting from a circumferential edge of the first rotary body 151 and a post projecting from a stator component (not shown) of the first valve 150, whereby the protrusion engages the post when the first rotary body 151 is set at the block position.

In various examples, when the first rotary body 151 is set at the block position, the first valve 150 is configured to block fluid flow from the first set of wells 130 to the second valve 160. In some examples, the first rotary body 151 is configured to rotate in a first direction from the block position to any of a plurality of first fluid positions to selectively permit flow from any one of the plurality of the first well ports 155 and associated first fluid wells 131 to the first valve outlet port 154. In other examples, the first rotary body 151 is configured to rotate bidirectionally from the block position to any of the plurality of first fluid positions connecting one of the first well ports 155 and associated first fluid wells 131 to the first valve outlet port 154.

In some examples, the first rotary body 151 may be set to a purge position (not shown), such that the first valve 150 permits fluid flow from an air source to separate the aliquots of fluid passing through the common fluid channel 105 by air bubbles.

Second valve 160 is constructed and arranged to selectively, fluidly connect one of the second fluid wells 141 of the second set of wells 140 to the inlet channel 111 of the fluidic circuit 110, connect the common channel 105 and the first valve 150 to the inlet channel 111 of the fluidic circuit 110, or connect the common channel 105 and the first valve 150 to the bypass channel 121 of the bypass fluidic circuit 120. In the example shown in FIGS. 1 and 2, the second valve 160 is a rotary valve comprising a second rotary body 161 rotatably mounted within the fluid cartridge 100 such that the second rotary body 161 is configured to rotate between a plurality of angular positions. In some examples, the second rotary body 161 comprises a disc (not shown) made from a rigid plastic material (e.g., polypropylene) and a cap (not shown) made from an elastomer material (e.g., Dynaflex®, Santoprene®, and silicone). In various examples, the second valve 160 comprises a second valve outlet, e.g., second valve outlet port 164, fluidly connected to the inlet channel 11 of the fluidic circuit 110, a bypass port 165 fluidly connected to the bypass channel 121 of the bypass circuit 120, a second valve inlet port 166 fluidly connected to the common channel 105 and the first valve 150, and a plurality of second well ports 167, each associated with one of the second fluid wells 141 of the second set of wells 140.

In the example shown in FIGS. 1 and 2, the bypass port 165, the second valve inlet port 166, and the plurality of second well ports 167 are disposed in a circumferential pattern about the second rotary body 161. In other examples (not shown), the bypass port 165, the second valve inlet port 166, and the plurality of second wells ports 167 may be placed in other arrangements that fluidly connect the second valve 160 to the bypass circuit 120, the first valve 150, and the second set of wells 140. In some examples, each second well port 167 is fluidly connected to its associated second fluid well 141 by a fluid channel.

Referring to FIG. 2, the second valve outlet port 164 is fluidly connected to the inlet channel 111 extending from the second valve 160 to the fluidic device 112. In some examples, the second valve outlet port 164 is disposed at about the center of the second rotary body 161 such that the bypass port 165, the second valve inlet port 166, and the set of second wells ports 167 are located at the same radial distance from the second valve outlet port 164. In the illustrated example, a portion of the inlet channel 111 extending from the second valve outlet port 164 that is superimposed with the rotary body 151—e.g., extends beneath the second rotary body 161—is shown in dashed lines.

In the example shown in FIGS. 1 and 2, the second rotary body 161 includes a second valve selector channel 162 extending radially from the second valve outlet port 164 toward a circumferential edge of the second rotary body 161.

Figure 3:
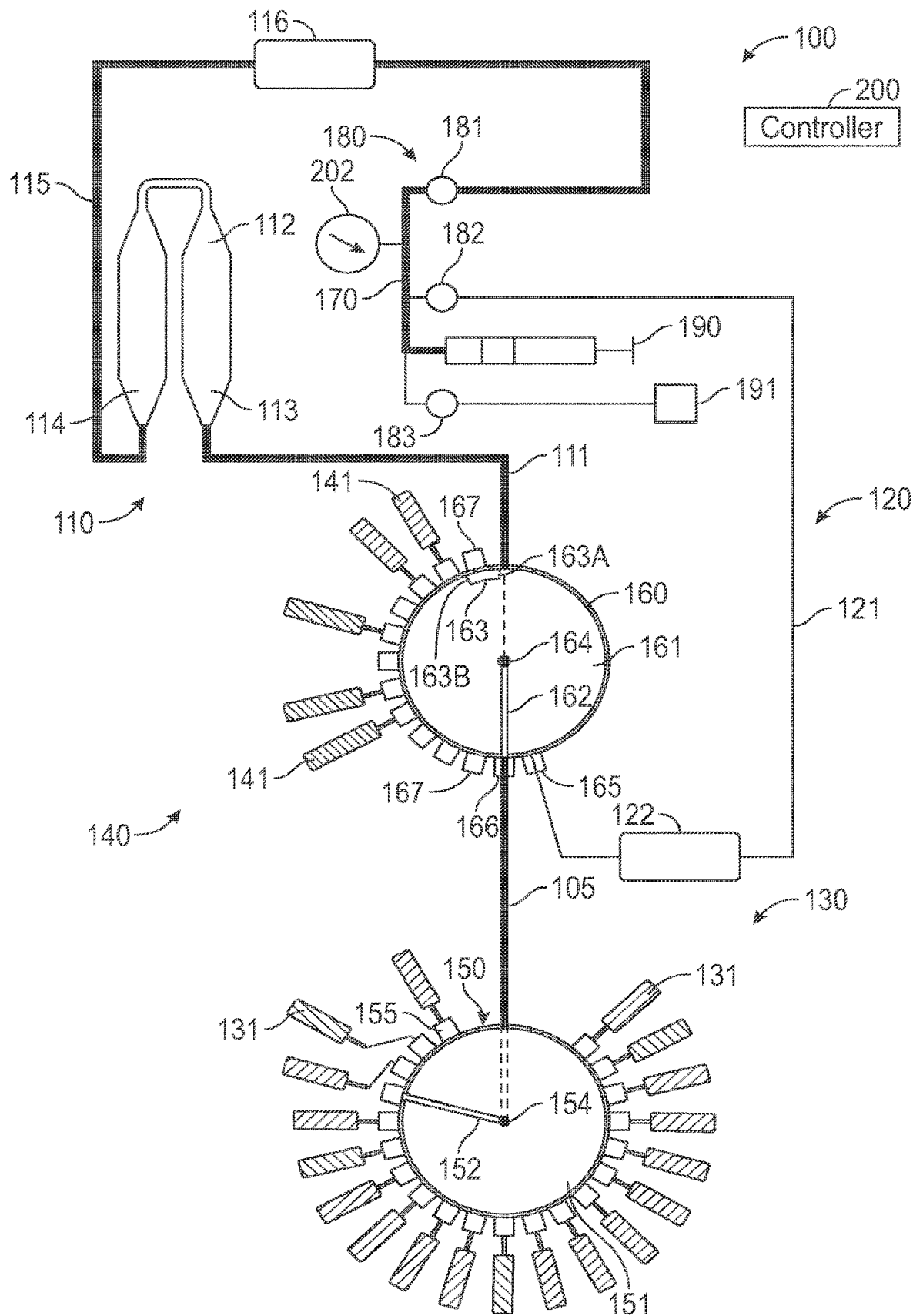
FIG. 3 is a schematic view of the example apparatus set in a first fluid process mode.
Figure 4:
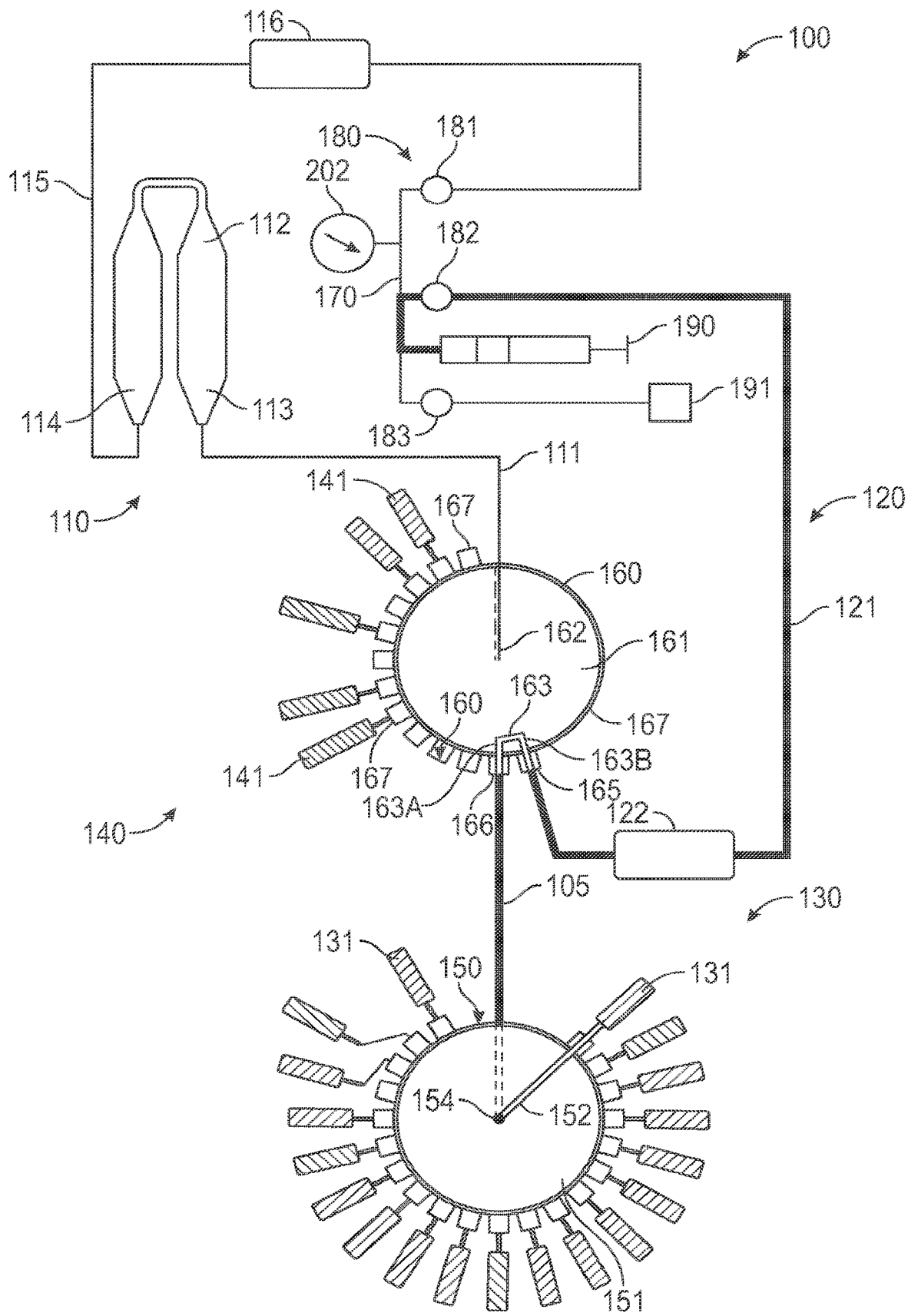
FIG. 4 is a schematic view of the example apparatus set in a bypass mode.
Figure 5:
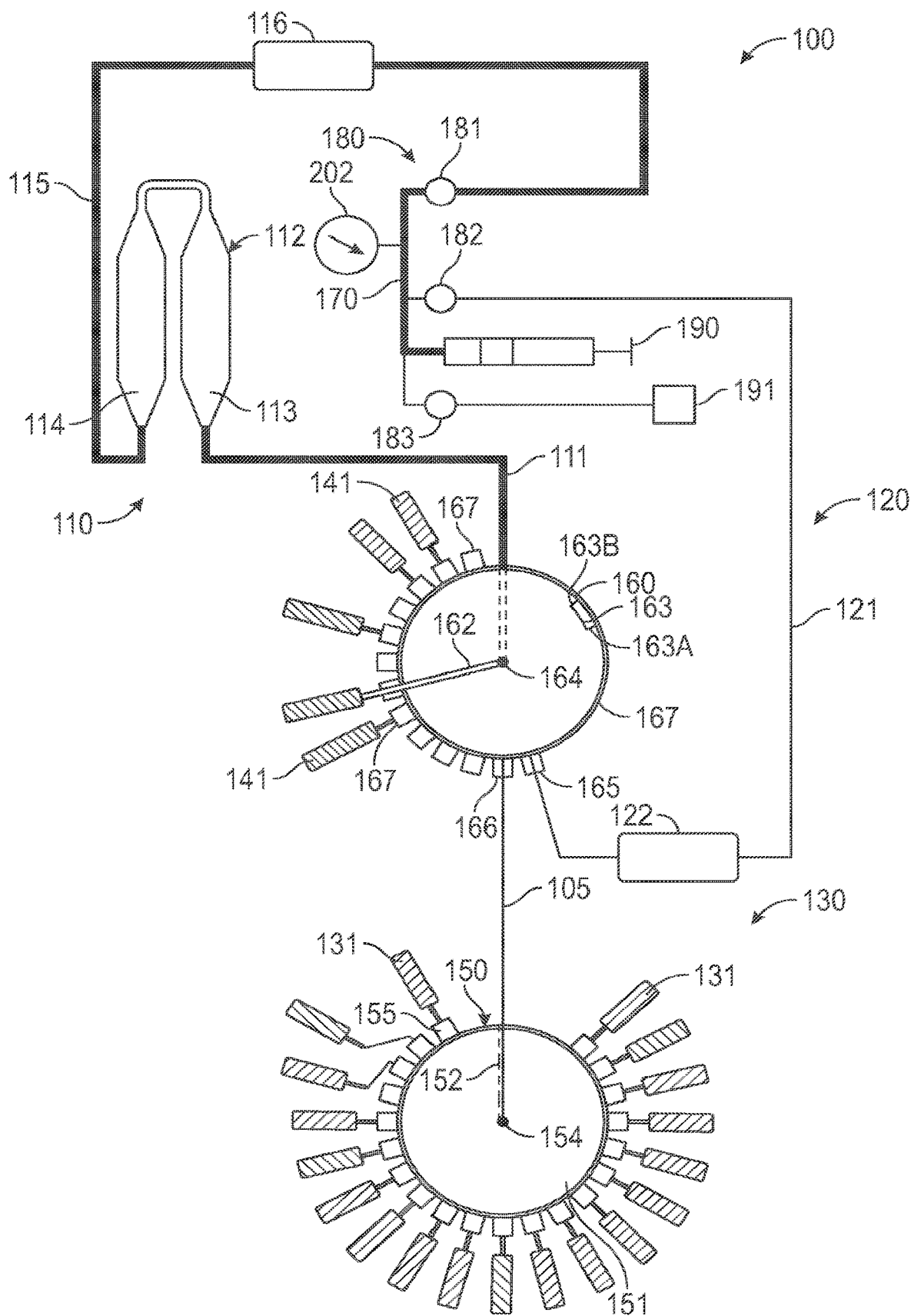
FIG. 5 is a schematic view of the example apparatus set in a second fluid process mode.
Figure 6:
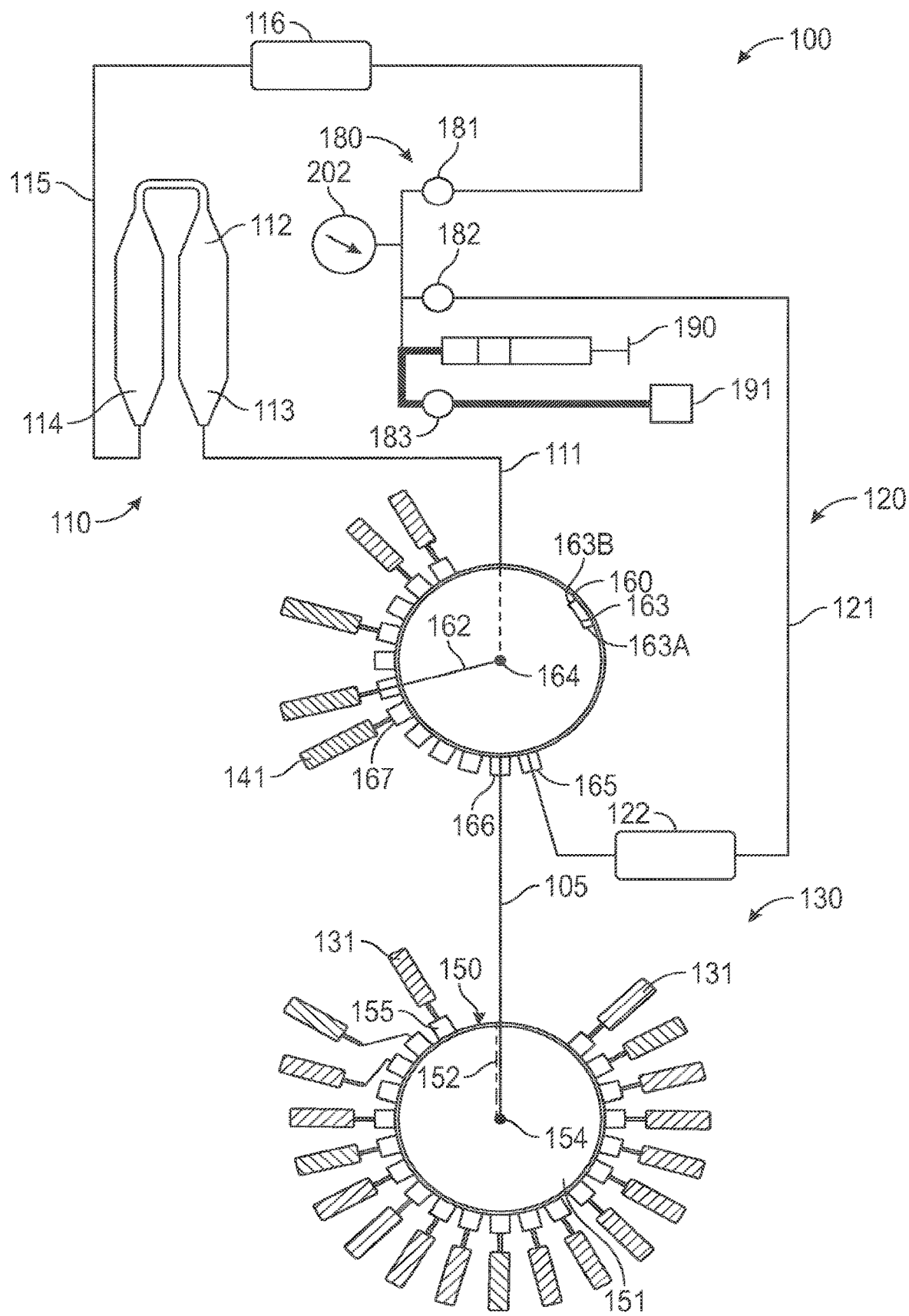
FIG. 6 is a schematic view of the example apparatus set in a waste mode.

In the example shown in FIGS. 1-7, the second rotary body 161 further includes a bypass selector channel 163 disposed proximate to the circumferential edge of the second rotary body 161. In some examples, the bypass selector channel 163 comprises a first end 163a, shown in FIG. 3, that is substantially radially aligned with the second valve selector channel 162 and a second end 163b that is offset from the second valve selector channel 162. Referring to FIGS. 3 and 6, when the second rotary body 161 is set at a bypass position, the first end 163a of the bypass selector channel 163 is configured to fluidly connect to the second valve inlet port 166, and the second end 163b of the bypass selector channel 163 is configured to fluidly connect to the bypass port 165. At the bypass position, the second valve selector channel 162 is not aligned with any of the second well ports 167 such that the second selector valve channel 162 is not fluidly connected to any of the second fluid wells 141. In some implementations, when the second rotary body 161 is set at the bypass position, the second valve selector channel 162 can be fluidly connect to a second fluid well 141 such that the second valve inlet port 166 is fluidly connected to the bypass port 165 while a selected second fluid well 141 is fluidly connected to the second valve outlet port 164.

In various examples, the second rotary body 161 is configured to rotate between a plurality of angular positions so that the second valve 160 permits fluid flow from: (i) one of the second fluid wells 141 of the second set of wells 140 to the inlet channel 111, (ii) the common channel 105 and the first valve 150 to the inlet channel 111, or (iii) the common channel 105 and the first valve to the bypass channel 121.

Rotation of the second rotary body 161 to an angular position where the second valve selector channel 162 is fluidly connected with one of the second well ports 167 permits fluid flow from the selected, corresponding second fluid well 141 through the second valve selector channel 162, through the second valve outlet port 164, and into the inlet channel 111. When the second valve selector channel 162 is fluidly connected with one of the second well ports 167, the first and second ends 163a, 163b of the bypass selector channel 163 are displaced from the second valve inlet port 166 and the bypass port 165, such that the bypass selector channel 163 is not in fluid communication with the second valve inlet port 165 and the bypass port 166.

Rotation of the second rotary body 161 to an angular position where the second valve selector channel 162 is fluidically connected with the second valve inlet port 166 permits fluid flow from the common fluid channel 105 and the first valve 150 through the second valve selector channel 162, through the second valve outlet port 164, and into the inlet channel 111. When the second valve selector channel 162 is fluidically connected with second valve inlet port 166, the first and second ends 163a, 163b of the bypass selector channel 163 are displaced from the second valve inlet port 166 and the bypass port 165, such that the bypass selector channel 163 is not in fluid communication with the second valve inlet port 165 and the bypass port 166.

In some examples, the second valve 160 may comprise a hard stop, similar to the example described above in connection with the first valve 150, to limit the rotation of the second rotary body 161 at a block position where the second valve selector channel 162 is not aligned with any one of the second well ports 167. When the second rotary body 161 is set at the block position, the second valve 160 prevents fluid flow from either the first valve 150 and or any one of the second set of wells 140 to the second valve outlet port 164 and prevents fluid flow from the first valve 150 to the bypass port 165.

In some examples, the second rotary body 161 is configured to rotate in the first direction from the block position to a first valve position, where the second valve selector channel 162 is aligned with the second valve inlet port 166, such that the second valve 160 permits fluid flow between the second valve inlet port 166 and the second valve outlet port 164. When the second rotary body 161 is set at the first valve position, the valve selector channel 162 is aligned with the second valve inlet port 166 so that the second valve selector channel 162 is fluidly connected to the second valve inlet port 165, and the bypass selector channel 163 is not fluidly connected to any one of the ports. In some implementations, the bypass selector channel 163 can fluidly connect a second well port 167 to another second well port 167 and/or to the bypass port 165.

In some examples, the second rotary body 161 is configured to rotate in the first direction from the block position to one or more second well positions such that the second valve 160 permits fluid flow between a selected second well port 167 and the second valve outlet port 164. When the second rotary body 161 is set at any one of the second well positions, the inlet end of the second valve selector channel 162 is fluidly connected to the selected second well port 167, and the bypass valve channel 163 is not fluidly connected to any one of the ports.

In various examples of the first valve 150 and the second valve 160, automated control and monitoring of the angular position of the first rotary body 151 and the second rotary body 161 may be provided. Each rotary body may be coupled to a motor or other motive means, for example, by gears, belts, pulleys, drive shafts, etc., so as to provide automated, on-demand powered rotation of the rotary body. Angular position control and monitoring of the rotary body may be provided by rotational position sensors, e.g., encoders, and/or stepper motors.

Referring to the example shown in FIG. 1, fluid cartridge 100 comprises a waste outlet 191 fluidly connected to the outlet channel 170, and a pump 190 may be fluidly connected to the outlet channel 170. In various examples, the pump 190 is configured to apply a pressure differential between the outlet channel 170 and any one of the fluidic circuit 110 and/or the bypass fluidic circuit 120 to propel fluid flow bi-directionally along any one of the fluidic circuit 110 and/or the bypass fluidic circuit 120. Pump 190 may comprise a syringe pump with an actuator (not shown) operatively associated with the syringe. In various examples, the actuator is configured to move a plunger of the syringe in a first direction to generate a negative pressure differential to draw fluid through the fluidic circuit 110 and/or the bypass fluidic circuit 120 toward (and possibly into) a barrel of the syringe. The actuator is further configured to move the plunger in a second direction, opposite to the first direction, to generate a positive pressure differential and expel fluid away from (and possible out of) the syringe and into any one of the fluidic circuit 110 and/or the bypass fluidic circuit 120. In other examples (not shown), the pump 190 may comprise any other pressure differential creating mechanism that is capable of reversing flow direction.

In some examples, as the plunger of the syringe pump 190 changes directions, there may be a lag (e.g., hysteresis) in pressure generated by the plunger. The operation of the syringe pump 190 may compensate for this lag by first changing the motion of the plunger in the opposite direction by a partial stroke, and then after waiting a predetermined amount of time, completing the stroke of plunger in the opposite direction. In one example, the plunger 190 may move in the first direction to aspirate the fluidic or bypass fluidic circuits 110, 120, and then, move in the second direction to dispense a fluid into the fluidic or bypass fluidic circuits 110, 120. The process of dispensing fluid into the fluidic or bypass fluidic circuits 110, 120 may be performed by first reversing the direction of the plunger in the second direction by a partial stroke to account for any lag in pressure generated by the syringe pump 190. After moving the plunger in the second direction by partial stroke, the stroke of the plunger in the second direction may be completed to ensure that the desired volume of fluid is dispensed into the fluidic or bypass fluidic circuit 110, 120.

In various examples, the fluid cartridge 100 comprises a valve array 180 comprising one or more manipulating valves 181-183 disposed along the outlet channel 170 to selectively control flow between the fluidic circuit 110, the bypass circuit 120, the pump 190, and the waste outlet 191. The one or more manipulating valves 181-183 includes a first manipulating valve 181 disposed at a junction between the post line 115 and the outlet channel 170, a second manipulating valve 182 disposed at a junction between the bypass fluid channel 121 and the outlet channel 170, and a third manipulating valve 183 disposed at a junction between the waste outlet 191 and the outlet channel 170.

In some examples, the third manipulating valve 183 is located closer to the pump 190 than the waste outlet 191 to promote bubble removal from the pump 190. The proximate location of the third manipulating valve 183 relative to the pump 190 reduces the likelihood that bubbles outputted from the pump 190 become trapped in the outlet channel 170, thereby allowing the bubbles to be purged efficiently from the fluidic cartridge 100.

In various examples, manipulating valves 181-183 may be pinch valves comprised of small rounded dips and may be compressed with external pinch rods to seal their corresponding channels. In various examples, material bonded over the channels should be sufficiently flexible to enable the use of this pinch valve regime. Only the channel with the open valve would allow for flow to occur thus generating specified flow of select fluids to their corresponding channels.

As shown in FIG. 1, a pressure sensor 202 (e.g. pressure meter) may be connected to the outlet channel 170 to monitor the pressure of the fluid flowing therethrough. In some examples, the pressure sensor 202 is configured to generate a signal indicating pressure measurements of the fluid flowing through the outlet channel 170, and the operation of the pump 190 and the valve array 180 may be based on the pressure measurements of the outlet channel 170.

Figures 7, 8:
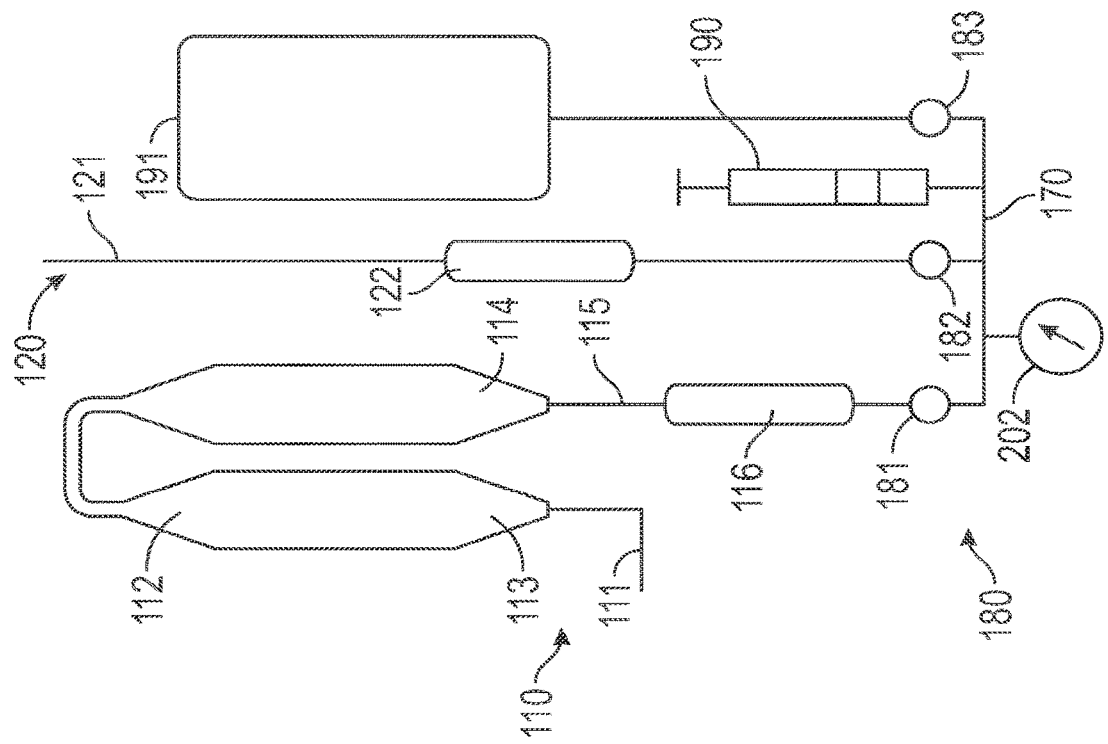
FIG. 7 is a schematic view of an example valve array disposed on an outlet channel fluidly connected to a fluidic circuit, a bypass fluidic circuit, a pump, and a waste outlet.
FIG. 8 is a table indicating various modes of operation of the example valve array.

Referring to FIGS. 7 and 8, in various examples, the valve array 180 may operate under various modes, in which particular manipulating valves 181-183 are set to open or closed positions to selectively control flow between the fluidic circuit 110, the bypass circuit 120, the pump 190, and the waste outlet 191. Referring to Table 1 of FIG. 8, in some examples, the valve array 180 may be set in an all open mode, in which all the manipulating valves 181-183 are set to an open position, designated by an '0' in the table. At the all open position, the valve array 180 permits concurrent fluid flow from both the fluidic circuit 110 and the bypass fluidic circuit 120 to the outlet channel 170 and fluid flow from the outlet channel 170 to the waste outlet 191.

Referring to Table 1 of FIG. 8, in some examples, the valve array 180 may be set in a fluidic circuit or flow cell mode, in which the first manipulating valve 181 is set to an open position and the second and third manipulating valves 182, 183 are set to a closed position, designated by an 'X' in the table. Under the fluidic circuit mode, the valve array 180 permits fluid flow between the fluidic circuit 110 and the pump 190, while preventing fluid flow between the bypass fluidic circuit 120 and the outlet channel 170 and preventing fluid flow between the outlet channel 170 and the waste outlet 191. Accordingly, under the fluidic circuit mode, fluid from any one of the first or second set of wells 130, 140 may be directed to the fluidic circuit 110, the cache reservoir 116, the outlet channel 170, and/or the pump 190, and fluid may be reversed to flow from the pump 190, the outlet channel 170, and/or the cache reservoir 116 back to the fluidic circuit 110.

Referring to Table 1 of FIG. 8, in some examples, the valve array 180 may be set in a waste mode, in which the third manipulating valve 183 is set to an open position and the first and second manipulating valves 181, 182, are set to a closed position. Under the waste mode, the valve array 180 permits fluid flow between the pump 190 and the waste outlet 191, while preventing fluid flow between the bypass fluidic circuit 120 and the outlet channel 170 and preventing fluid flow between the fluidic circuit 110 and the outlet channel 170. Accordingly, under the waste mode, fluid from the pump 190 and/or the outlet channel 170 may be directed to the waste outlet 191.

Referring to Table 1 of FIG. 8, in some examples, the valve array 180 may be set in a bypass mode, in which the second manipulating valve 182 is set to an open position and the first and third manipulating valves 181, 183 are set to a closed position. Under the bypass mode, the valve array 180 permits fluid flow between the bypass fluidic circuit 120 and the pump 190, while preventing fluid flow between the fluidic circuit 110 and the outlet channel 170 and preventing fluid flow between the outlet channel 170 and the waste outlet 191. Accordingly, under the bypass mode, fluid from any one of the first or second set of wells 130, 140 may be directed to the bypass fluidic circuit 120, the outlet channel 170, and/or the pump 190, and fluid may be reversed to flow from the pump 190 and/or the outlet channel 170 to the bypass fluidic circuit 120.

In various examples, the valve array 180 is configured to minimize cross-contamination or volume inaccuracy that may occur during a transition between two modes of operation. In various examples, the fluid manipulating valves 181-183 are positioned such that in the event that the first and second fluid manipulating valves 181, 182 are both open momentarily, the fluid flow will be directed to the waste outlet 191, which reduces the risk of cross-contamination between two or more fluids in the fluidic device 112. In various examples, the fluid manipulating valves 181-183 are driven by a cam (not shown) disposed in the instrument (not shown) configured to process the fluid cartridge 100. The interaction between the fluid manipulating valves 181-183 and the cam is configured to minimize the transition time between two modes of operation, thereby reducing the likelihood of cross-contamination or volume inaccuracy.

Operation Modes of Fluid Cartridge

In various examples, as shown in FIGS. 3-6, the fluid cartridge 100 operates under various modes to selectively direct fluid from any one of the first fluid wells 131 of the first set of wells 130 to the fluidic circuit 110 or the bypass circuit 120 or from any one of second fluid wells 141 of the second set of wells 140 to the fluidic circuit 110.

Referring to FIG. 3, the first valve 150 and the second valve 160 may be set to a first fluid process mode to permit fluid flow from a selected first fluid well 131 of the first set of wells 130 to the fluidic circuit 110 and block flow from the second set of wells 140. Under the first fluid process mode, the first rotary body 151 of the first valve 150 is set to connect the first valve selector channel 152 with a selected one of the first well ports 155 to permit fluid flow from the associated first well 131 to the first valve outlet port 154, and the second rotary body 161 of the second valve 160 is set to connect the second valve selector channel 162 with the second valve inlet port 166 to permit fluid flow between the second valve inlet port 166 and the second valve outlet port 164. At the same time, the valve array 180 is set in the fluidic circuit mode to permit fluid flow from the fluidic circuit 110 to the outlet channel 170 and the pump 190 with valve 181 open and valves 182 and 183 closed. As shown in FIG. 3, an aliquot of a first fluid (indicated by a bold line) is directed from the selected first well 131 to the second valve 160 via the common fluid channel 105 and through fluidic device 112 to undergo a fluid process. After passing through the fluidic device 112, the aliquot of the first fluid may be temporarily held in the cache reservoir 116 or sent directly into the syringe pump 190.

Referring to FIG. 4, the first valve 150 and the second valve 160 may be set to a bypass mode to permit fluid flow from a selected first fluid well 131 of the first set of wells 130 to the bypass fluidic circuit 120 and to block flow from the second set of wells 140. Under the bypass mode, the first rotary body 151 of the first valve 150 is set to connect the first valve selector channel 152 with a selected one of the first well ports 155 to permit fluid flow from the associated first well 131 to the first valve outlet port 154, and the second rotary body 161 of the second valve 160 is set to align the bypass selector channel 163 with the second valve inlet port 166 and the bypass port 165 to permit fluid flow between the second valve inlet port 166 and the bypass port 165. At the same time, the valve array 180 is set in the bypass mode to permit fluid flow from the bypass fluidic circuit 120 to the outlet channel 170 and the pump 190 with valve 182 open and valves 181 and 183 closed. As shown in FIG. 4, an aliquot of a first fluid (indicated by a bold line) is directed from the selected first well 131 to the second valve 160 via the common fluid channel 105 and into the bypass channel 121, where the aliquot of the first fluid may be held temporary in the cache reservoir 122 and/or sent directly into the syringe pump 190.

Referring to FIG. 5, the first valve 150 and the second valve 160 may be set to a second fluid process mode to permit fluid flow from a selected second fluid well 141 of the second set of wells 140 to the fluidic circuit 110 and to block flow from the first set of wells 130. Under the second fluid process mode, the first valve 150 is set to the block position, where the first valve selector channel 152 is not aligned with any of the first well ports 155 to block fluid from the first set of wells 130. The second valve 160 is set to connect the second valve selector channel 162 with a selected one of the second well ports 167 to permit fluid flow from the associated second fluid well 141 to the second valve outlet port 164. At the same time, the valve array 180 is set in the fluidic circuit mode to permit fluid flow from the fluidic circuit 110 to the outlet channel 170 and the pump 190, with valve 181 open and valves 182 and 183 closed. As shown in FIG. 5, an aliquot of a second fluid (indicated by a bold lined) is directed from the selected second fluid well 141 to the fluidic device 112 via the inlet channel 111 to undergo a fluid process. After passing through the fluidic device 112, the aliquot of the second fluid may be temporarily held in the cache reservoir 116 and/or sent directly into the syringe pump 190.

Referring to FIG. 6, the fluid cartridge 100 may be set to a waste mode. Under the waste mode, the first valve 150 is set to the block position, where the first valve selector channel 152 is not aligned with any of the first well ports 155, to block fluid from the first set of wells 130, and the valve array 180 is set in the waste mode, with valve 183 open and valves 181 and 182 closed, to permit fluid flow between the pump 190 and the waste outlet 191 and block flow from the either the fluidic circuit 110 or the bypass fluidic circuit 120 to the outlet channel 170. Under the waste mode, the second valve 160 may be set in any position without directing fluid flow to both the fluidic circuit 110 and the bypass fluidic circuit 120. As shown in FIG. 6, the used fluid held in the syringe pump 190 or another reservoir may be emptied into the waste outlet 191 for disposal.

In some examples, the aliquot of the first fluid or the aliquot of the second fluid temporarily held in the cache reservoir 116 may be reintroduced again into the fluidic device 112, according to reagent reuse processes described in Stone et al. in U.S. Pat. No. 9,410,977, "FLUIDIC SYSTEM FOR REAGENT DELIVERY TO A FLOW CELL," filed Aug. 7, 2014.

In some examples, the aliquot of the first fluid temporarily held in the cache reservoir 122 may be used to mix with other fluids, such as another reagent solution, according to mixing processes described in U.S. Patent Publication No. 2018/0185842, "REAGENT CHANNEL MIXING SYSTEM AND METHOD," filed Dec. 13, 2017.

According to the examples described in the present disclosure, the fluid cartridge 100 permits a second type of fluid process operation, such as transferring, mixing, or priming of fluid, to take place in the bypass fluid circuit 120 that is completely independent from the fluidic device 112. For example, a first fluid may be stored in fluidic device 112 for a first fluid processing operation (e.g., incubation), while a second fluid may be directed to the cache reservoir 122 and/or the syringe pump 190 via the bypass fluidic circuit 120 to undergo a second fluid processing operation (e.g., priming). By operating two independent fluid operations concurrently, the fluid cartridge 100 may reduce or curtail the cumulative time to complete multiple fluid processes through parallelization.

According to examples described in the present disclosure, the fluid cartridge 100 allows certain fluids that may be incompatible with each other or that may otherwise be preferable to keep apart to remain separated by holding a first set of fluids in the first set of wells 130 associated with the first valve 150 and holding a second set of fluids in the second set of wells 140 associated with the second valve 160. For example, a first set of fluids used for clustering and paired-end priming (CPE) operations may be held in the first set of wells 130 and handled by the first valve 150 and the bypass channel 163 of the second valve 160, and a second set of fluids used for sequencing-by-synthesis (SBS) operations may be held in the second set of wells 140 and handled by the second valve selector channel 161 of the second valve 160. The second valve 160 may be configured such that the bypass channel 163 does not pass over any of the second well ports 167, thereby preventing any unintended cross-contamination between the first set of fluids intended for CPE operations and the second set of fluids intended for the SBS operations.

According to the examples described in the present disclosure, the fluid cartridge 100 allows the fluids to be arranged based on workflow and usage. For example, the second set of fluids intended for the SBS operations are selected and moved more frequently during the sequencing process than the first set of fluids intended for the CPE operations. Accordingly, in various examples, the second set of fluids held in the second set of wells 140 are handled only by the second valve 160 such that while the second set of fluids are being selected and moved by the second valve 160, the first set of fluids held in the first set of wells 130 may selectively remain idle and protected by the first valve 150. The arrangement between the first and second set of wells 130 and 140 and the first and second valves 150, 160 reduces the overall distance that the valves 150, 160 must rotate over a sequencing process, thereby improving the overall reliability of the fluid cartridge 100.

Processing Instrument

Figure 10:
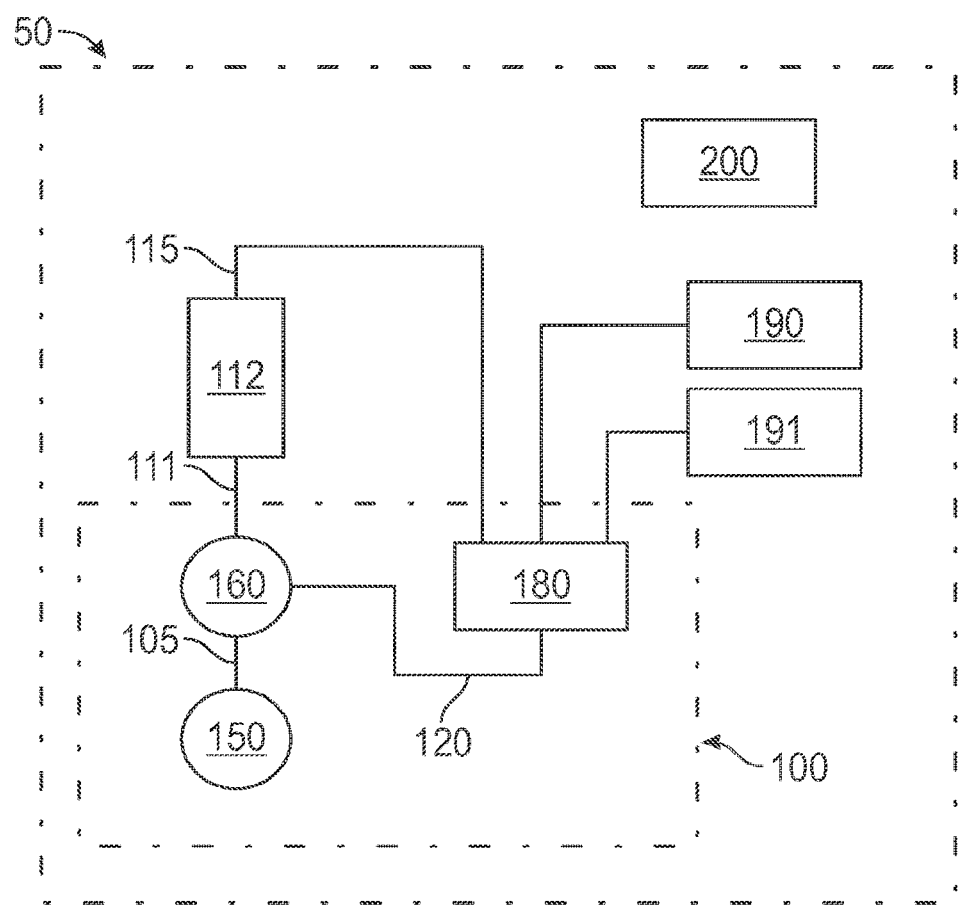
FIG. 10 is a schematic diagram of fluid cartridge incorporated into a processing instrument.

The fluid cartridge 100 may be removably coupled to a fluid processing instrument. As schematically shown in FIG. 10 removable fluid cartridge 100 may be operatively installed into a processing instrument 50. As described above, fluid cartridge 100 includes first valve 150 connected to second valve 160 by a common fluid channel 105. Fluid cartridge 100 further includes bypass circuit 120 connecting second valve 160 to valve array 180. Fluidic device 112 may be operatively coupled to the instrument 50 and is connected to the second valve 160 of the cartridge 100 by the inlet channel 111. Instrument 50 may further include waste outlet 191 (and possibly a waste reservoir) and pump 190, both connected to valve array 180 of the cartridge 100. Controller 200, which may be part of the instrument 50 or may be a standalone or remote computer resource operatively connected to the instrument 50, controls operation of the instrument 50 (e.g., processing of the fluidic device 112 and operation of the pump 190) and operation of the cartridge 100 (e.g., operation of the first and second valve 150, 160 and operation of the valve array 180).

Hardware and Software

Aspects of the disclosure are implemented via control and computing hardware components, user-created software, data input components, and data output components. Hardware components include computing and control modules (e.g., system controller(s)), such as microprocessors and computers, configured to effect computational and/or control steps by receiving one or more input values, executing one or more algorithms stored on non-transitory machine-readable media (e.g., software) that provide instruction for manipulating or otherwise acting on the input values, and output one or more output values. Such outputs may be displayed or otherwise indicated to a user for providing information to the user, for example information as to the status of the instrument or a process being performed thereby, or such outputs may comprise inputs to other processes and/or control algorithms. Data input components comprise elements by which data is input for use by the control and computing hardware components. Such data inputs may comprise positions sensors, motor encoders, as well as manual input elements, such as graphic user interfaces, keyboards, touch screens, microphones, switches, manually-operated scanners, voice-activated input, etc. Data output components may comprise hard drives or other storage media, graphic user interfaces, monitors, printers, indicator lights, or audible signal elements (e.g., buzzer, horn, bell, etc.). Software comprises instructions stored on non-transitory computer-readable media which, when executed by the control and computing hardware, cause the control and computing hardware to perform one or more automated or semi-automated processes.

In some examples, the apparatus may include a control system including a computer controlled controller 200 (schematically represented in FIG. 1). Controller 200 may be a control system or computer connected to fluid cartridge 100 or may include computer components integrated with the fluid cartridge 100. These computer components may include one or more microprocessors, displays, keyboards (and/or other user input devices), memory components, printer(s), etc. Controller 200 may be configured to receive inputs from a user (e.g., user-inputs) or feedback devices, such as pressure sensors, flow meters, etc., and manage the performance of the fluid operations of the fluid cartridge 100. Controller 200 may include software algorithms that enable a user to enter user-defined parameters related to fluid processing operations into the fluid cartridge 100, schedule different fluid processing operations on the fluid cartridge 100, and cause the controller 200 to perform the different steps associated with the fluid processing operations, monitor the performance of the fluid processing operations, and output results (on display, printout, etc.) for the user.

In various examples, the controller 200 is operatively linked to the first valve 150, the second valve 160, the valve array 180, and the pump 190 (the communication lines are omitted from the drawings) such that the controller 200 may send instructions to different devices of fluid cartridge 100 to perform different steps associated with the fluid processing operations (e.g., the processes associated with FIGS. 3-6 and 9).

Method for Directing Fluid Held in the Fluid Cartridge

Figure 9:
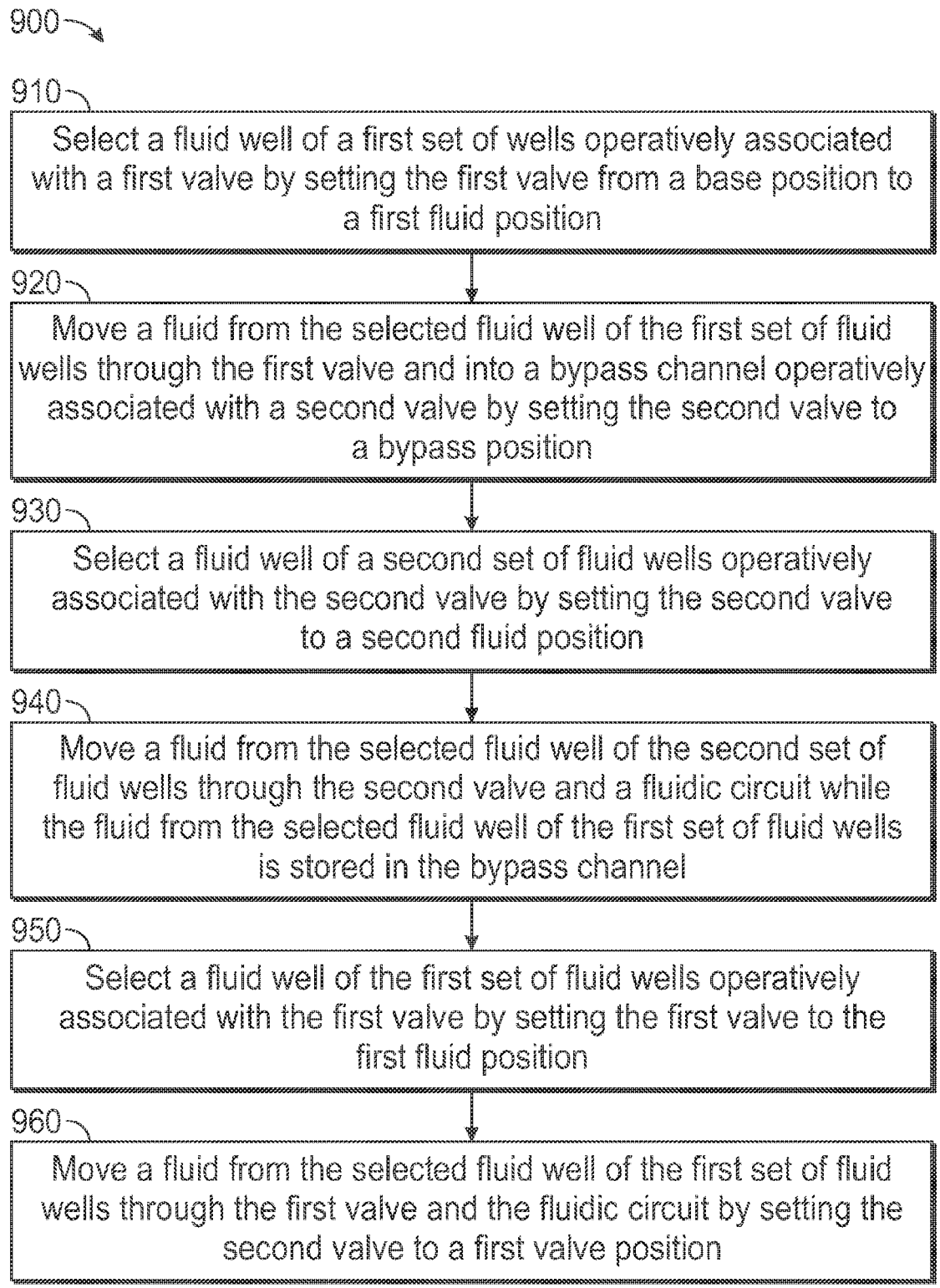
FIG. 9 is flow chart of an example method for directing fluid flow of any one a first set of wells and a second set of wells to a fluidic circuit or a bypass circuit.

According to various examples, FIG. 9 illustrates a method 900 for directing fluid from any one of a first set of wells 130 and a second set of wells 140 to a fluidic circuit 110 or a bypass fluidic circuit 120.

As shown in FIG. 9, the method 900 comprises a step 910 of selecting a first fluid well 131 of the first set of wells 130 operatively associated with the first valve 150 by setting the first valve 150 from the block position to a first fluid position, where the first valve selector channel 152 is connected with one of the first well ports 155 corresponding to the selected first fluid well 131. In some examples, the step 910 further comprises using a first actuator comprising a motor (not shown) operatively connected to the first valve 150 to rotate first valve body 151 from the block position to the first fluid position. In some examples, the step 910 further comprises using a controller 200 operatively linked to the first actuator to command the first valve 150 to be reconfigured from the block position to the first fluid positon.

As shown in FIG. 9, the method 900 comprises a step 920 of moving a first fluid from the selected first fluid well 131 through the first valve 150 into the bypass channel 121 operatively associated with the second valve 160 by setting the second valve 160 to a bypass position, where the first end 163a of the bypass selector channel 163 is aligned with the second valve inlet port 166 and the second end 163b of the bypass selector channel 163 is aligned with the bypass port 165. In some examples, the step 920 further comprises using the pump 190 to create pressure differential to drive fluid flow from the selected first fluid well 131, through the first valve 150, and to the bypass channel 121. In some examples, the step 920 comprises using a second actuator comprising a motor (not shown) operatively connected to the second valve 160 to rotate the second valve body 161 into connection with the bypass channel 121. In some examples, the step 920 further comprises using the controller 200 operatively linked to the second actuator to command the second valve 160 to be reconfigured to the bypass position.

As shown in FIG. 9, the method 900 comprises a step 930 of selecting a second fluid well 141 of the second set of wells 140 operatively associated with the second valve 160 by setting the second valve 160 to a second well position, where the second valve selector channel 162 is aligned with one of the second well ports 167 corresponding to the selected second fluid well 141. In some examples, step 930 comprises using the second actuator to rotate the second valve body 161 to the second well position. In some examples, step 930 further comprises using the controller 200 operatively linked to the second actuator to command the second valve 160 to be reconfigured to the second well position. In some examples, step 930 further comprises blocking the fluid stored in the first set of wells 131 from moving through the first valve 150, the common channel 105, and into the second valve 160 by setting the first valve to the block position.

As shown in FIG. 9, the method 900 comprises a step 940 of moving a second fluid from the selected second fluid well 141 of the second set of wells 140 through the second valve 160 and into the fluidic circuit 110, while the first fluid moved from the selected first fluid well 131 in step 920 is stored in the bypass channel 121. The step 940 may further comprise holding the selected first fluid in the cache reservoir 122 and moving the selected second fluid into the fluidic device 112. In some examples, the step 940 further comprises using the pump 190 to create pressure differential to drive fluid flow from the selected second fluid well 142, through second valve 160, and into the fluidic circuit 110.

In some examples, the method 900 comprises a step 950 of selecting a first fluid well 131 of the first set of fluid wells 130 operatively associated with the first valve 150 by setting the first valve 150 to the first fluid position. In some examples, step 950 comprises selecting the first fluid well 131 selected in step 910. In some examples, step 950 comprises selecting a first fluid well 131 not selected in step 910, which holds a third fluid that is different than the first fluid held in the selected first fluid well 131 of step 910.

In some examples, the method 900 comprises a step 960 of moving a fluid from the selected first fluid well 131 of the first set of wells 130 through the first valve 150, the common channel 105, the second valve 160 and the fluidic circuit 110 by setting the second valve 160 to the first valve position, where the second valve selector channel 162 is connected with the second valve inlet port 166. In some examples, the step 960 comprises using the second actuator to rotate the second valve 160 to the first valve position. In some examples, the step 960 further comprises using the controller 200 operatively linked to the second actuator to command the second valve 160 to be rotated to the first valve position In some examples, the method 900 may comprise, after step 920, moving at least a portion of the selected first fluid from the bypass channel 121 to the outlet channel 170 and into the syringe pump 190, and then, expelling the portion of selected first fluid held in the syringe pump 190 through the outlet channel 170 and into the fluidic circuit 110. In some examples, the step of moving at least the portion of the selected first fluid from the bypass channel 121 to the outlet channel 170 comprises using the actuator to move the plunger of the syringe pump 190 in the first direction to generate a negative pressure differential. In some examples, the step of expelling the portion of selected first fluid held in the syringe pump 190 through the outlet channel 170 and into the fluidic circuit 110 comprises using the actuator to move the plunger of the syringe pump 190 in the second direction to generate a positive pressure differential. In some examples, the step of moving at least the portion of the selected first fluid from the bypass channel 121 to the outlet channel 170 comprises opening the second manipulating valve 182 into the open position setting the first and third manipulating valves 181, 183 into the closed position by setting the valve array 180 in the bypass mode. In some examples, the step of expelling the portion of the selected first fluid from the syringe pump 190 to the outlet channel 170 and into the fluidic circuit 110 comprises opening the first manipulating valve 181 into the open position setting the second and third manipulating valves 182, 183 into the closed position by setting the valve array 180 in the flow cell mode.

In some implementations, the method 900 may comprise, after step 940, the selected first fluid from the bypass channel 121 can be moved into the fluidic circuit 110 by setting the second valve 160 to a bypass supply position, where the second valve selector channel 162 is aligned with the bypass port 165. In some examples, this step comprises using the second actuator to rotate the second valve body 161 to the bypass supply position. In some examples, the step further comprises using the controller 200 operatively linked to the second actuator to command the second valve 160 to be reconfigured to the bypass supply position. In some examples, the step further comprises blocking the fluid stored in the first set of wells 131 from moving through the first valve 150, the common channel 105, and into the second valve 160 by setting the first valve to the block position.

In some examples, the method 900 may comprise, after step 940, moving at least a portion of the selected second fluid from the fluidic circuit 110 to the outlet channel 170 and into the syringe pump 190. In some examples, the step of moving at least the portion of the selected second fluid from the fluidic circuit 110 to the outlet channel 170 comprises using the actuator to move the plunger of the syringe pump 190 in the first direction to generate a negative pressure differential. In some examples, the step of moving at least the portion of the selected second fluid from the fluidic circuit 110 to the outlet channel 170 comprises opening the first manipulating valve 181 into the open position setting the second and third manipulating valves 182, 183 into the closed position by setting the valve array 180 in the flow cell mode.

In some examples, the method 900 may comprise a process of introducing a volume of air into the bypass channel 121 by setting the first valve 150 to a purge position by connecting the first valve selector channel 152 to a source of air or other gas or liquid and setting the second valve 160 to the bypass position connecting the bypass selector channel 163 to the second valve inlet port 166 and the bypass port 165.

In some implementations, the steps 910, 920, 930, 940, 950, and/or 960 of the method 900 can be performed in any order and are not limited to the specific order shown in FIG. 9. Moreover, any of the steps 910, 920, 930, 940, 950, and/or 960 of the method 900 can be omitted.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the subject matter of this disclosure has been described and shown in considerable detail with reference to certain illustrative examples, including various combinations and sub-combinations of features, those skilled in the art will readily appreciate other examples and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. An apparatus comprising:
a fluidic circuit;
a bypass fluidic circuit;
a first set of fluid wells;
a second set of fluid wells;
a first valve having a first valve outlet and a plurality of first well ports, the plurality of first well ports operatively associated with the first set of fluid wells, the first valve selectively fluidly connecting a first well of the first set of fluid wells to the first valve outlet when in a first position and selectively fluidly connecting a second well of the first set of fluid wells to the first valve outlet when in a second position; and
a second valve having a second valve outlet, a bypass selector channel, and a plurality of second well ports, the second valve outlet operatively associated with the fluidic circuit, the bypass selector channel operatively associated with the bypass fluidic circuit and the first valve outlet, the second valve selectively fluidly connecting a first well of the second set of fluid wells to the fluidic circuit when in a first well position and selectively fluidly connecting the bypass selector channel to the bypass fluidic circuit when in a bypass position.

2. The apparatus of claim 1 further comprising a common channel fluidly connecting the first valve outlet to the second valve.

3. The apparatus of claim 1, wherein the second valve is rotatable between a plurality of positions.

4. The apparatus of claim 1, wherein the second valve selectively fluidly connects the first valve outlet to the fluidic circuit when in a first valve position.

5. The apparatus of claim 1, wherein the second valve selectively fluidly connects a second well of the second set of fluid wells to the fluidic circuit when in a second well position.

6. The apparatus of claim 1, wherein the first valve is rotatable between a plurality of positions.

7. The apparatus of claim 1 further comprising:
an outlet channel fluidly connecting the bypass fluidic circuit and the fluidic circuit to a pump.

8. The apparatus of claim 7, wherein the outlet channel is fluidly connected to a waste outlet.

9. The apparatus of claim 8 further comprising:
a valve array comprising one or more valves disposed along the outlet channel to selectively control flow between the bypass fluidic circuit, the fluidic circuit, the pump, and the waste outlet.

10. The apparatus of claim 1, wherein the bypass fluidic circuit comprises a bypass cache reservoir to hold a first predetermined volume of fluid.

11. The apparatus of claim 1, wherein the fluid circuit comprises a fluidic device and a fluidic cache reservoir, the fluidic cache reservoir holding a second predetermined volume of fluid downstream from the fluidic device.

12. An apparatus comprising:
a fluidic circuit fluidly connected to a flow cell;
a bypass channel;
a first fluid well;
a second fluid well;
a first valve comprising a first valve outlet port and a plurality of first well ports, a first of the plurality of first well ports operatively associated with the first fluid well such that the first valve selectively permits flow from the first fluid well to the first valve outlet port; and
a second valve comprising:
a second valve outlet port fluidly connected to the fluidic circuit,
a bypass port fluidly connected to the bypass channel,
a second valve inlet port fluidly connected to the first valve outlet port,
a second fluid well port fluidly connected to the second fluid well, and
a second valve rotary body to rotate to a plurality of second valve positions such that the second valve selectively permits flow from a selected one of the second fluid well port and the second valve inlet port to the second valve outlet port or from the second valve inlet port to the bypass port.

13. The apparatus of claim 12, wherein the bypass port, the second valve inlet port, and the second fluid well port are arranged in a circumferential pattern, and the second valve rotary body comprises:
a second valve selector channel fluidly connecting the second valve outlet port to one of the second valve inlet port or the second fluid well port, and
a bypass selector channel fluidly connecting the second valve inlet port to the bypass port when the second valve rotary body is set at a bypass position.

14. The apparatus of claim 12, wherein the first valve comprises a first valve rotary body to rotate to a plurality of first valve positions such that the first valve selectively controls flow from a selected one of the plurality of first well ports to the first valve outlet port; and
wherein the first valve rotary body comprises a first valve selector channel fluidly connecting a selected one of the plurality of first well ports to the first valve outlet port.

15. The apparatus of claim 12, wherein the second valve selectively fluidly connects the first valve outlet port to the fluidic circuit when in a first valve position.

16. The apparatus of claim 12, wherein the second valve selectively fluidly connects the second fluid well to the fluidic circuit when in one of the second valve positions.

17. The apparatus of claim 12, wherein the second fluid well comprises one of a plurality of second fluid wells, and wherein the second valve includes a plurality of second fluid well ports, each fluidly connected to one of the plurality of second fluid wells.

18. The apparatus of claim 12 further comprising an outlet channel fluidly connecting the bypass channel and the fluidic circuit to a pump.

19. The apparatus of claim 18, wherein the outlet channel is fluidly connected to a waste outlet.

20. The apparatus of claim 19 further comprising a valve array comprising one or more valves disposed along the outlet channel to selectively control flow between the bypass channel, the fluidic circuit, the pump, and the waste outlet.

* * * * *